C. E. LARRABEE.
RECORDING LOCK.
APPLICATION FILED NOV. 11, 1918.
1,357,715.
Patented Nov. 2, 1920.
12 SHEETS—SHEET 1.
Fig. 1.
Fig. 2.
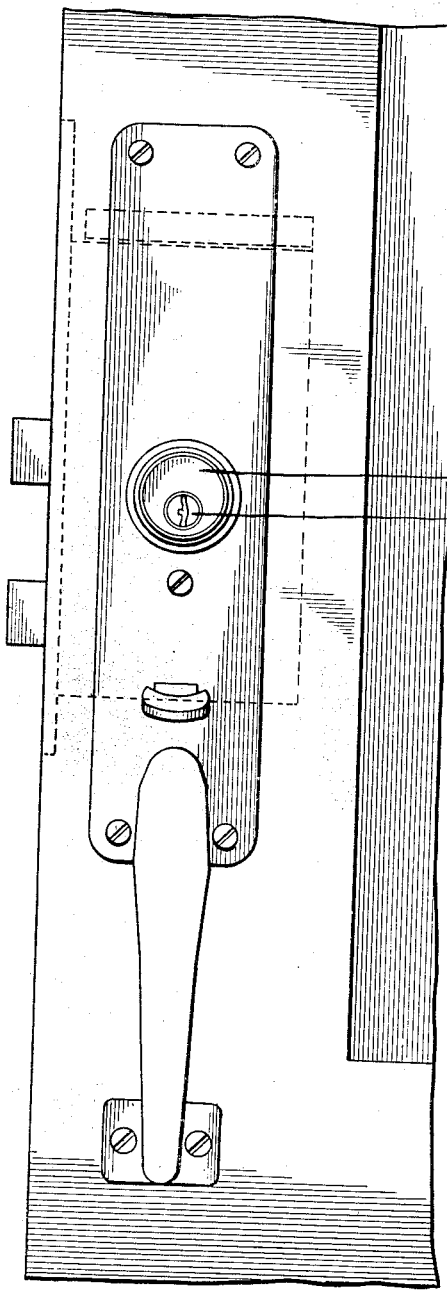
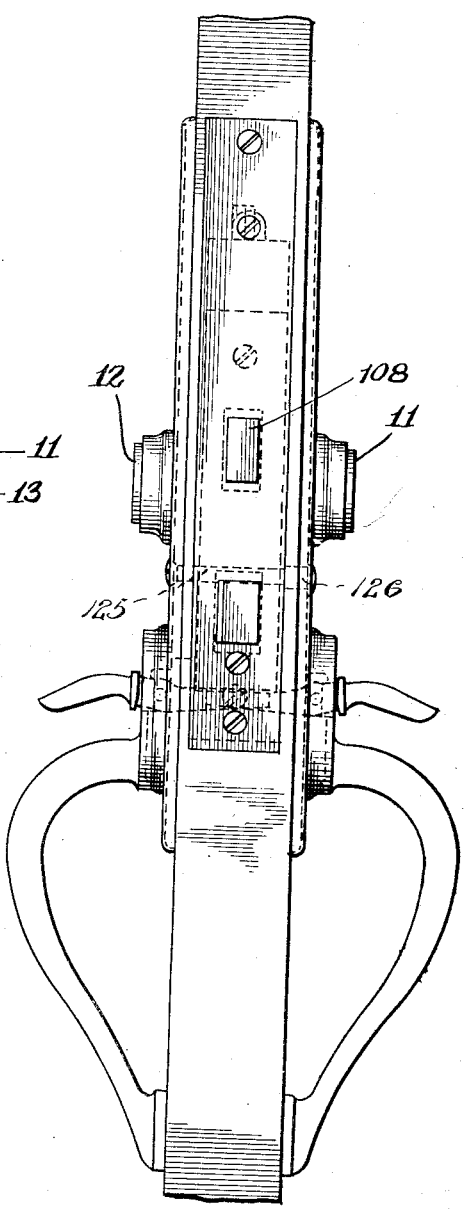
INVENTOR.
Clinton E. Larrabee
BY
ATTORNEYS.

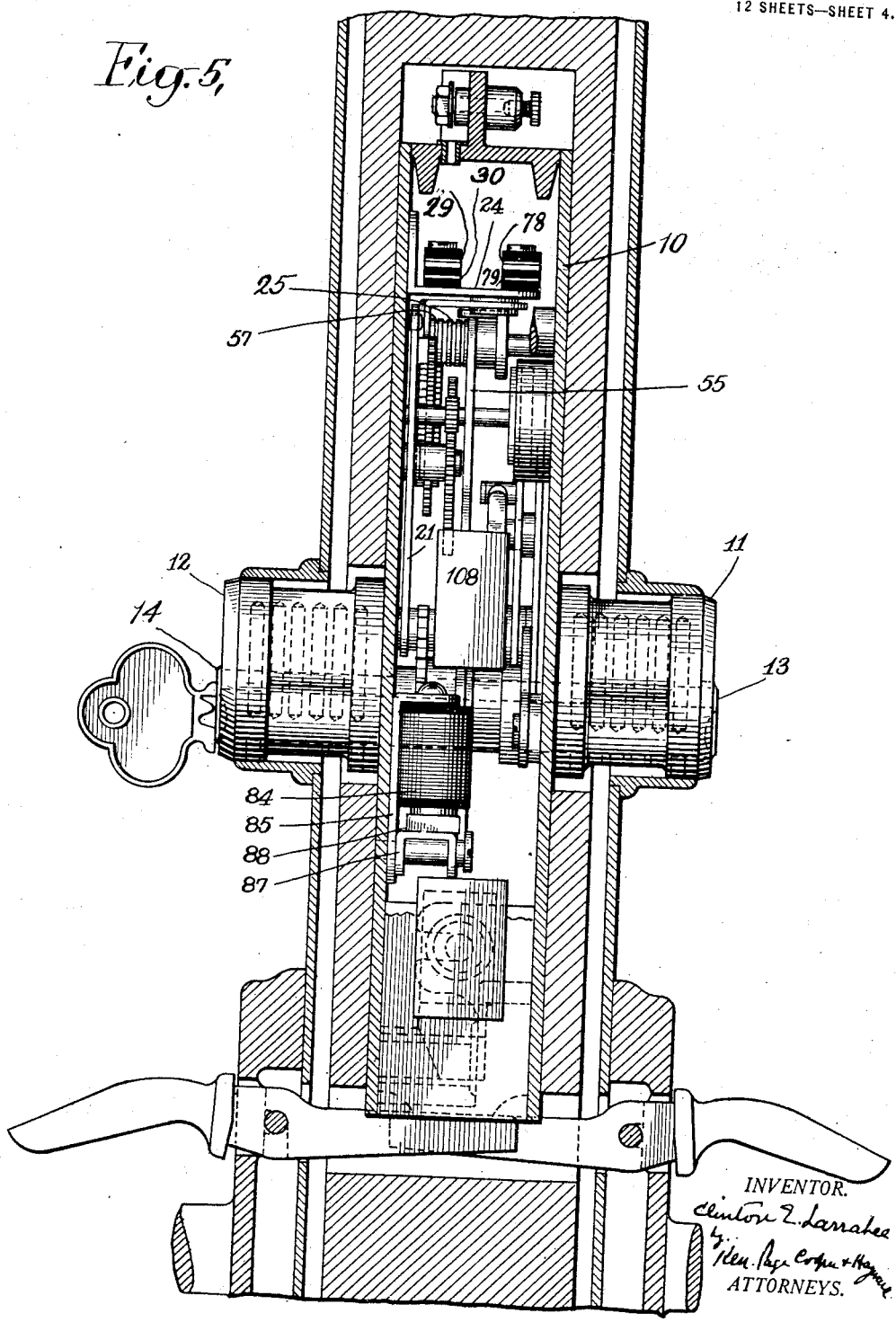

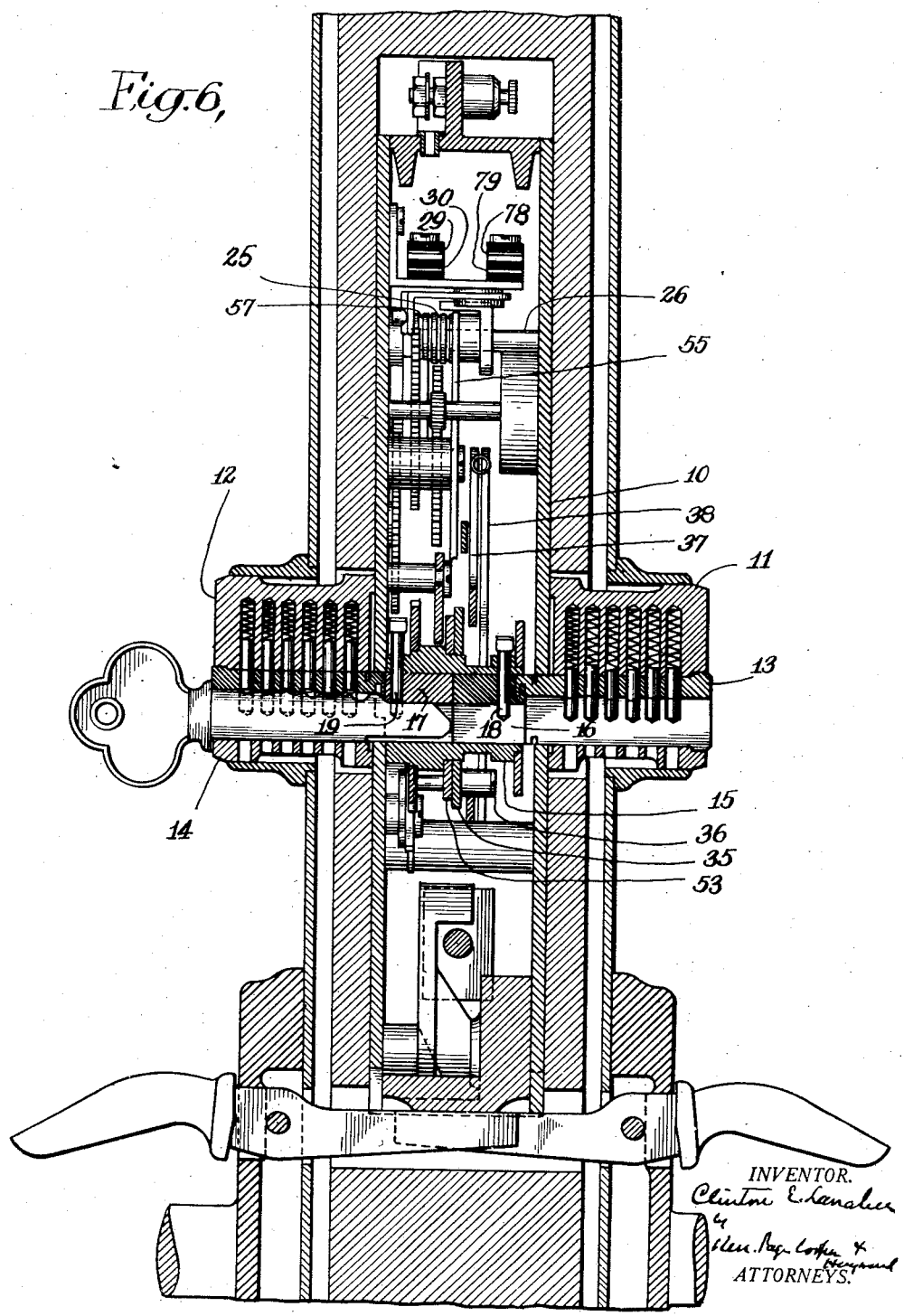

C. E. LARRABEE.
RECORDING LOCK.
APPLICATION FILED NOV. 11, 1918.
1,357,715.
Patented Nov. 2, 1920.
12 SHEETS—SHEET 6.
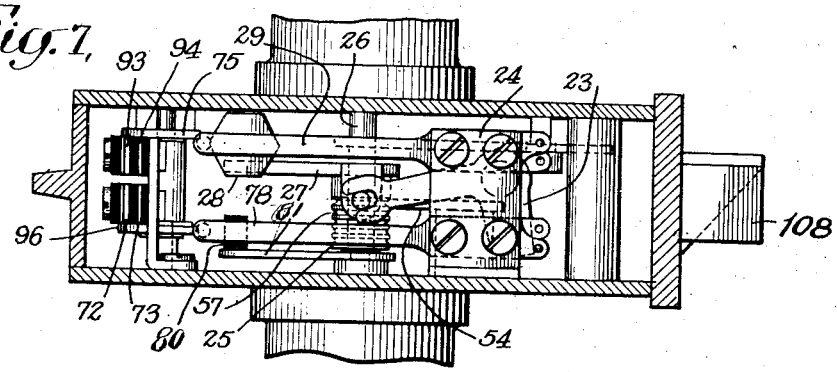
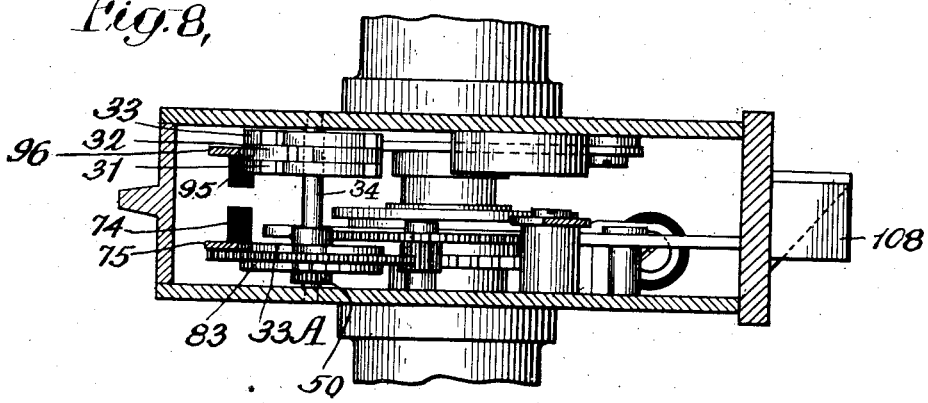
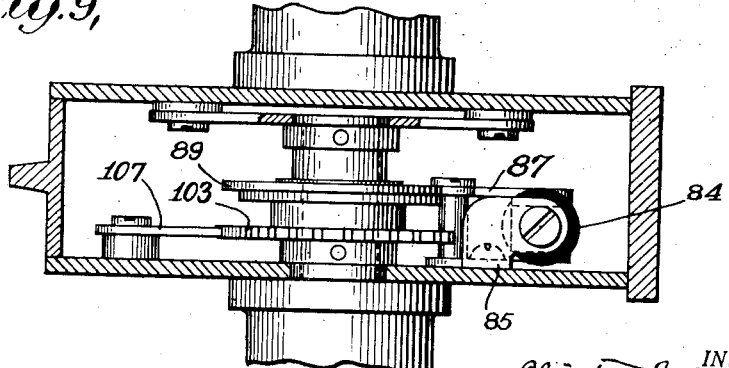
INVENTOR.
Clinton E. Larrabee
BY
ATTORNEYS.

C. E. LARRABEE.
RECORDING LOCK.
APPLICATION FILED NOV. 11, 1918.
1,357,715.
Patented Nov. 2, 1920.
12 SHEETS—SHEET 7.
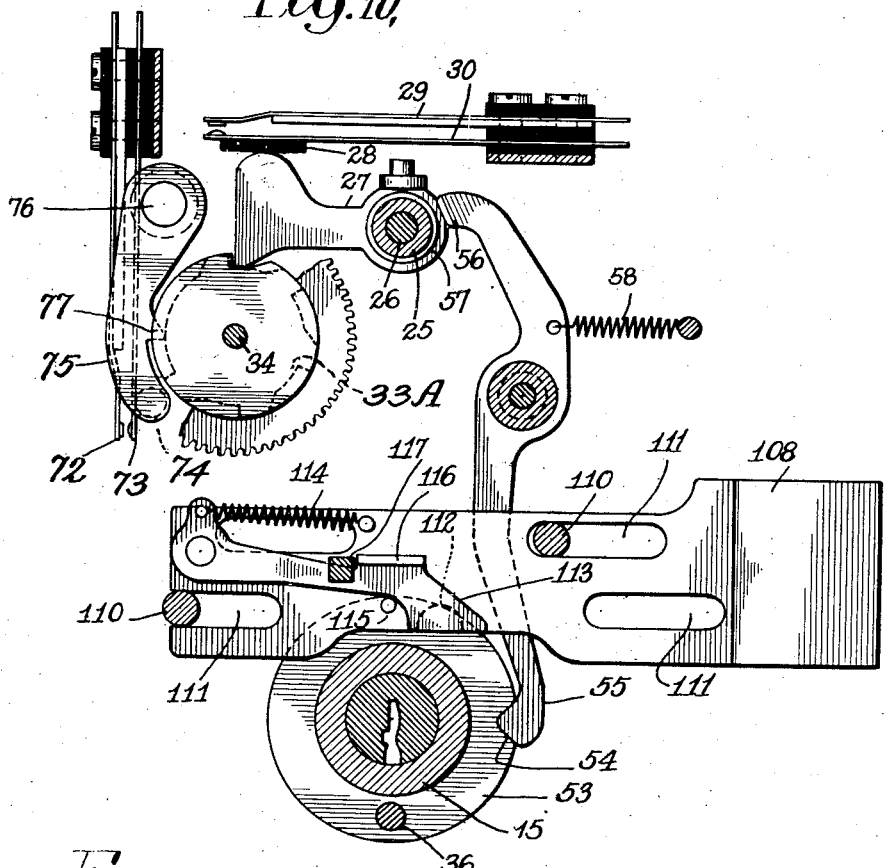
Fig. 10,
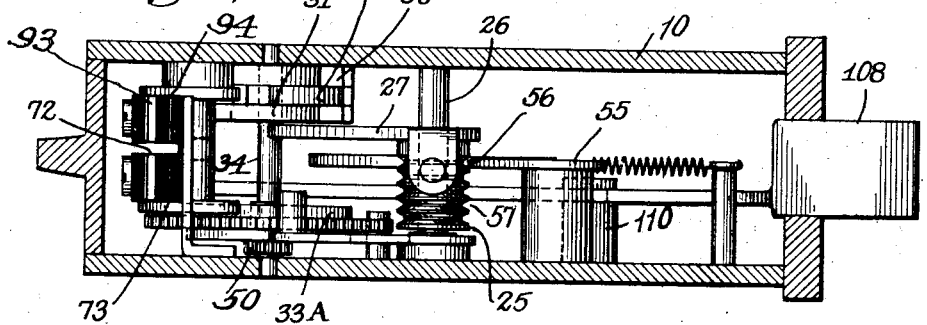
Fig. 11,
INVENTOR.
Clinton E. Larrabee
BY
ATTORNEYS.

C. E. LARRABEE.
RECORDING LOCK.
APPLICATION FILED NOV. 11, 1918.
1,357,715.
Patented Nov. 2, 1920.
12 SHEETS—SHEET 8.
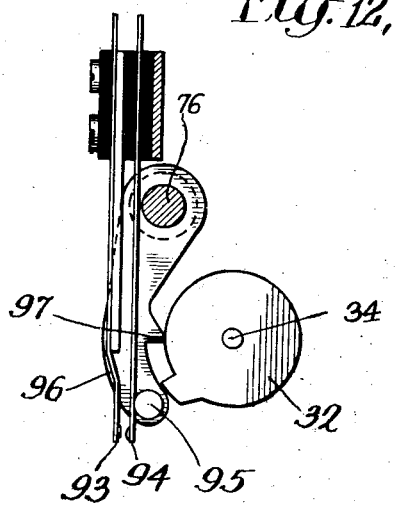
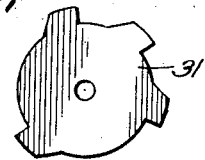
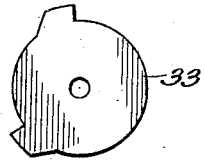
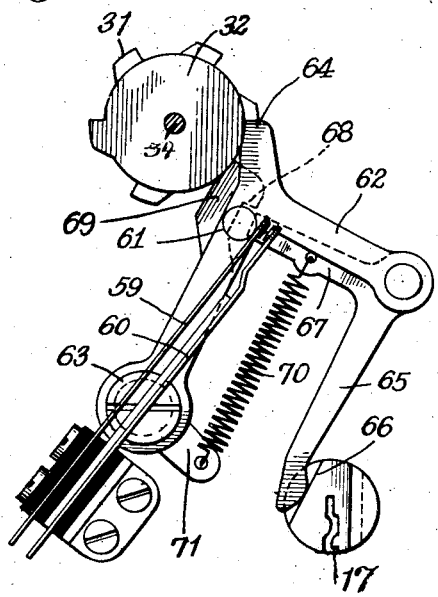
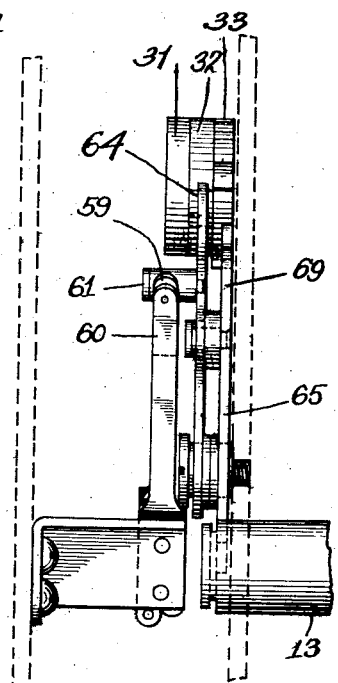
INVENTOR.
Clinton E. Larrabee
BY
ATTORNEYS.

C. E. LARRABEE.
RECORDING LOCK.
APPLICATION FILED NOV. 11, 1918.

1,357,715.

Patented Nov. 2, 1920.
12 SHEETS—SHEET 9.

INVENTOR.
Clinton E. Larrabee
BY
ATTORNEYS.

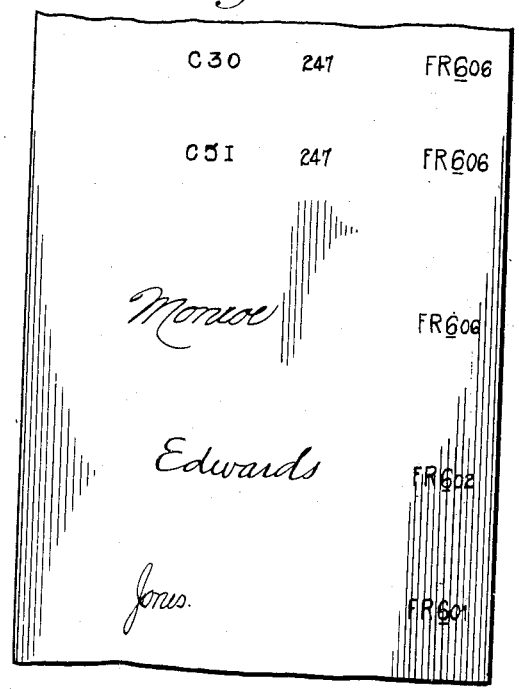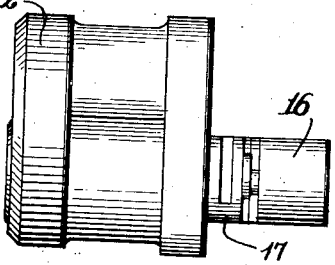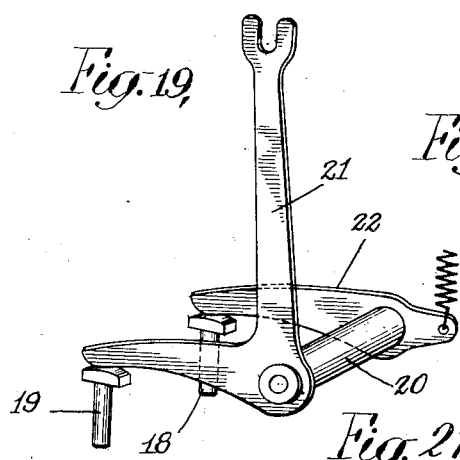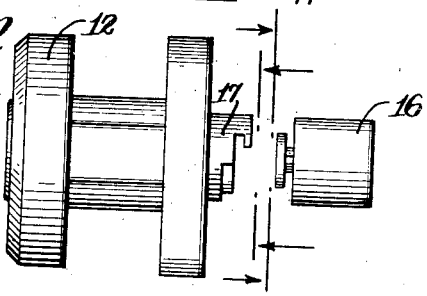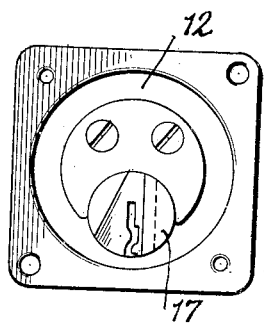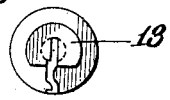

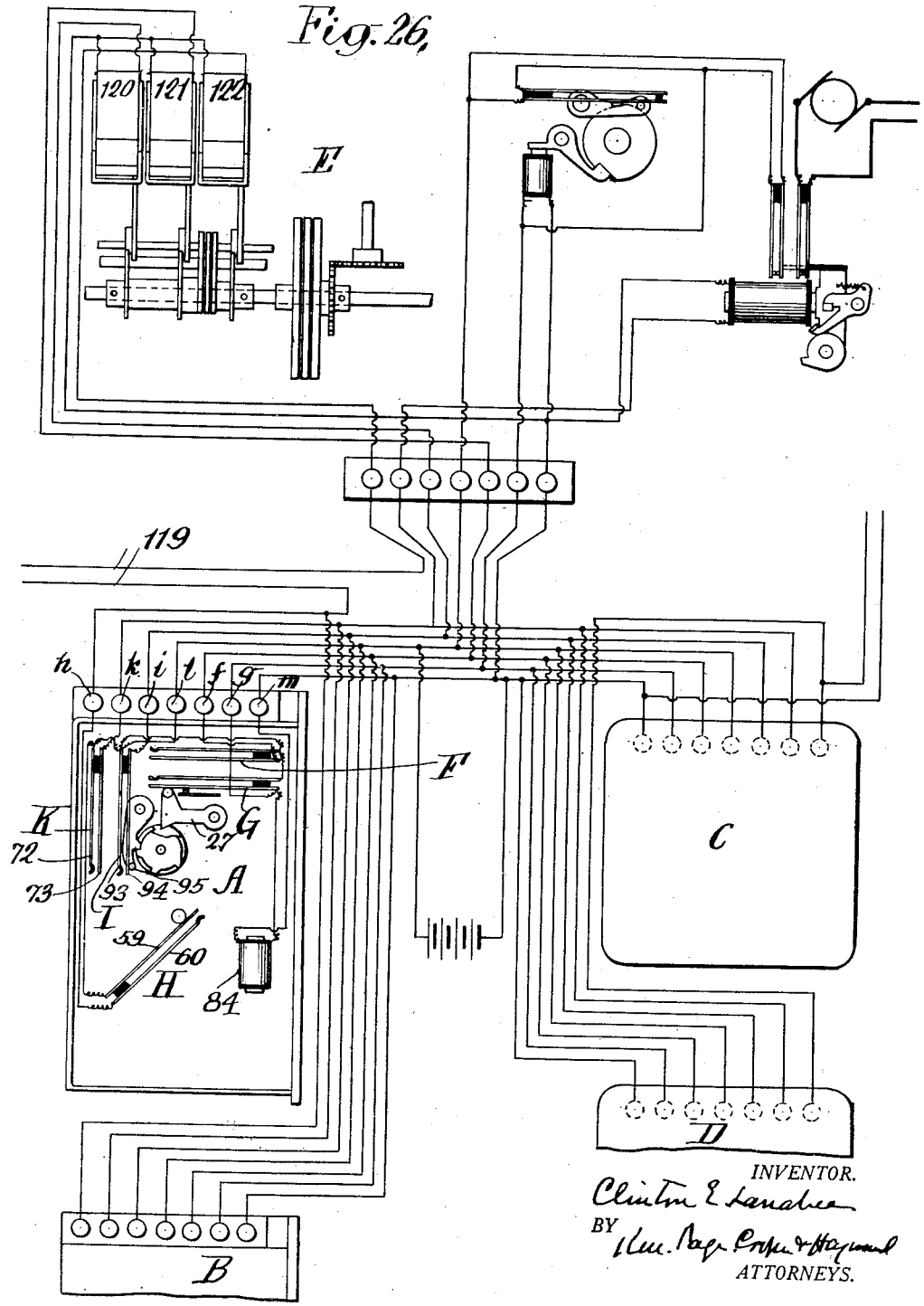

UNITED STATES PATENT OFFICE.

CLINTON E. LARRABEE, OF BINGHAMTON, NEW YORK, ASSIGNOR TO THE INTERNATIONAL TIME RECORDING COMPANY OF NEW YORK, A CORPORATION OF NEW YORK.

RECORDING-LOCK.

1,357,715.

Specification of Letters Patent. Patented Nov. 2, 1920.

Application filed November 11, 1918. Serial No. 261,976.

*To all whom it may concern:*

Be it known that I, CLINTON E. LARRABEE, a citizen of the United States, residing at Binghamton, in the county of Broome and State of New York, have invented certain new and useful Improvements in Recording-Locks, of which the following is a full, clear, and exact description.

This invention relates to so-called "recording locks", usually door locks, by which certain information respecting the operation of the lock is recorded in permanent form, as for example, the time at which it is locked or unlocked, whether it was operated from the inside or the outside of the room, etc. More particularly the present invention relates to that class of devices in which the actual recording of the information is effected by separate apparatus, or recording mechanism, which may be at a point more or less remote, but which is controlled by this lock. The chief object of the invention is to provide an improved lock of the type mentioned, of simple, durable and reliable construction. To this and other ends the invention consists in the novel features of construction and combinations of elements hereinafter described.

In the preferred form of the invention, provision is made for recording three items, namely, the time at which the lock is operated, the number or other means of identification of the key used, and whether the same was operated from inside or outside the room. As stated, the actual printing or making of the records is not effected by or at the lock, but by a recorder under the control of the lock. This recorder is controlled electrically, through one or more circuits, as by varying the strength, polarity, number or duration of current-impulses therein, etc. In the embodiment hereinafter specifically illustrated and described, the operation of the recorder is determined by the number of impulses (in general, without regard to their polarity) transmitted by the lock; except, of course, the time at which the lock is operated, which last record is taken from a clock. In the embodiment illustrated, the make-and-break of the circuit or circuits is effected by movable contacts of a simple type by means of cams or ratchets working in coöperation with the contacts and having one, two, or more teeth or projections according to the number of impulses to be sent over the particular circuit or circuits controlled thereby. These ratchets or cams are themselves actuated preferably by the turning of the key in the lock, and provision is made, as for example by a friction brake, to prevent turning the key at a rate too fast for proper performance of the various functions of the lock in their proper sequence.

As before stated, the present embodiment provides for identifying the key used, as by numbers, letters, or other characters assigned to the keys individually, and also provides for indicating whether the key was used from inside or outside the room. In the construction illustrated, the mere insertion of the key into the lock "sets up" certain selectors or parts which, when the key is turned to advance or withdraw the bolt of the lock, cause the proper number of impulses to be transmitted to identify the key used and whether it was inserted from inside or outside. Provision is also made whereby having once begun to turn the key the operator cannot withdraw the key unless he completes the operation already begun.

Where two or more locks (say on different doors of the same room or building) are used in connection with one recording apparatus, the present embodiment of the invention provides also for identifying the several locks, as by numbers, letters, or other characters or symbols. Moreover, provision is made to prevent the operation of two or more locks simultaneously, inasmuch as such operation would not identify both keys separately and might not identify either. Means are therefore provided whereby at the instant a person starts to operate one of the locks by turning a key therein the others are locked against actuation until the operation of the first is completed.

The embodiment thus briefly outlined is illustrated in the accompanying drawings, in which—

Figure 1 is a front view and Fig. 2 a side view of the complete lock installed on a door.

Fig. 5 is a front view of the mechanism of the lock, with the outer casing and part of the door in section on line 5—5 of Fig. 3.

Fig. 6 is a broken vertical cross section mainly at the center or axis of the rotary key-barrels, on line 6—6 of Fig. 3.

Figure 3:
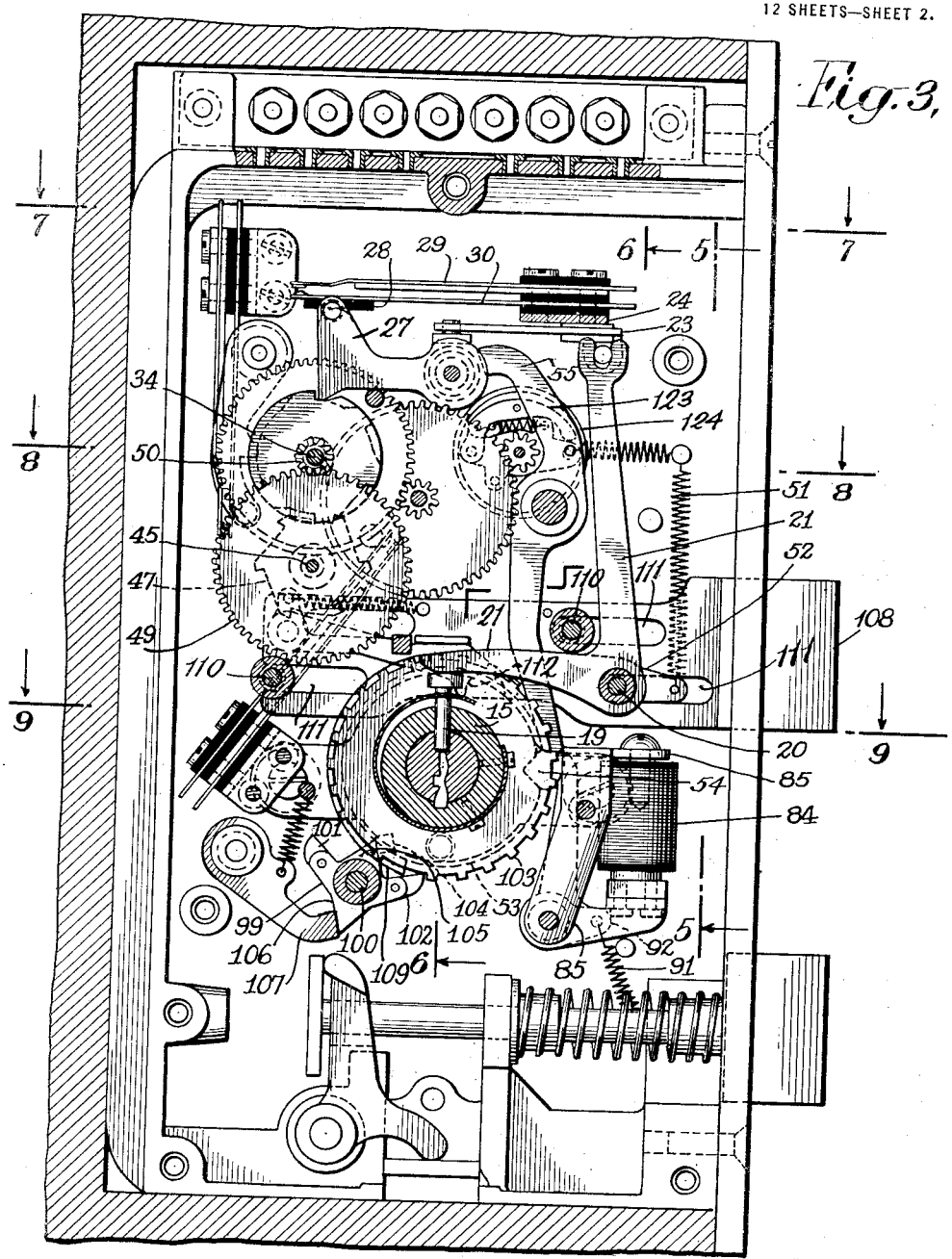
Fig. 3 is a side view, partly in section, of the mechanism of the lock as seen from the left of Fig. 2.

Figs. 7, 8 and 9 are horizontal sections on lines 7—7, 8—8 and 9—9, respectively, of Fig. 3.

Fig. 10 is a detail side view, on a larger scale and partly in section, illustrating the bolt-actuating mechanism, the contacts controlling the key-identification records, the contacts controlling the printing of the key-identification and other records, and the parts which actuate these contacts.

Fig. 11 is a detail plan view, showing the locking mechanism by which the parts set up or adjusted by the key are secured in position until the completion of their appropriate functions in the operation of the lock.

Fig. 12 is a detail side view of the contacts, and coöperating parts, which control the key and door identification records.

Fig. 13 is a detail side view of contacts, and actuating devices, which control the record showing whether the lock was operated from the inside or the outside of the room; in other words, the "in" and "out" records.

Fig. 14 is an edgewise or front view of the devices shown in Fig. 13.

Figs. 15 and 16 are detail side views of two of the notched or toothed wheels used to actuate certain contacts.

Figure 17:
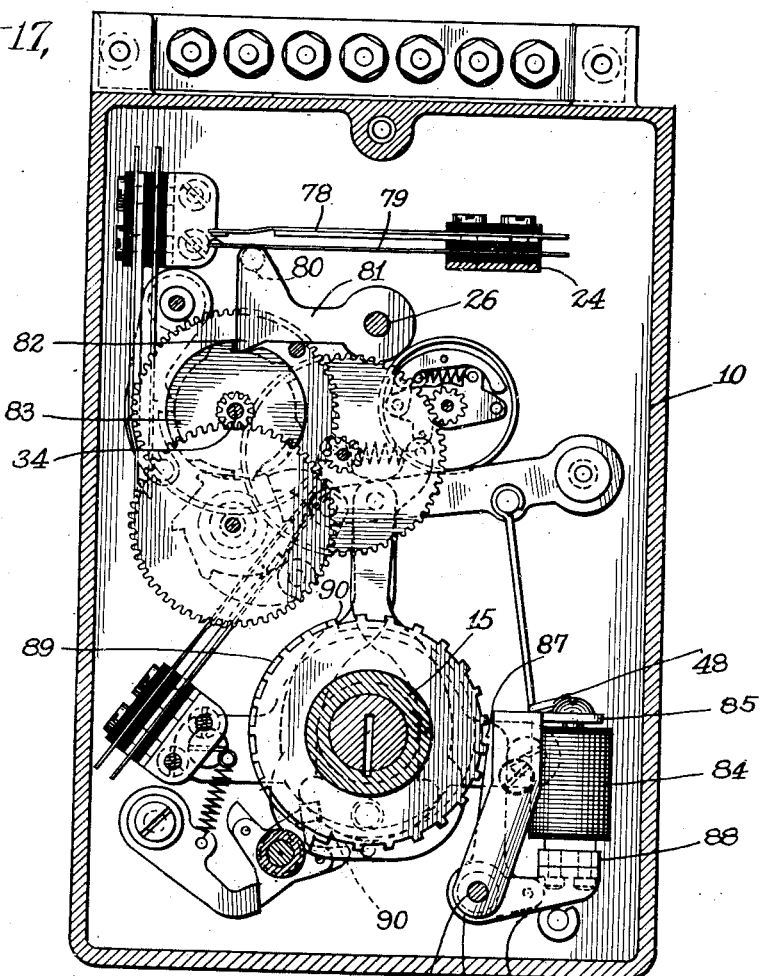

Fig. 17 is a side view and part section illustrating an embodiment designed particularly for watchmen's use. Such devices are located at the various points which are to be visited by the watchman in making his rounds and are operated by him to record at the central point or station the times at which his visits are made. The device illustrated is similar in construction to that shown in Figs. 1 to 16 inclusive, except that it has no bolt and bolt-actuating mechanism, and no "in and out" mechanism; provision being made only for recording the station number and key number, and, of course, the time. In the detailed description the same reference numerals are used in this figure and the next as in the others, so that a separate description of the watchman's station will not be needed.

Figure 18:
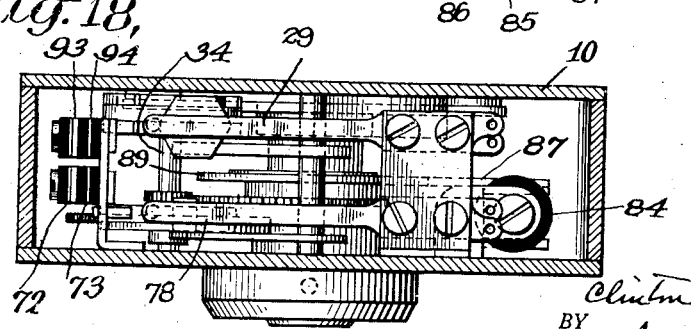

Fig. 18 is a plan view of the mechanism shown in Fig. 17.

Fig. 19 is a detail perspective view of certain parts employed in the key-identifying function of the apparatus.

Fig. 20 is a front view of the barrel of the lock.

Fig. 21 is an elevation of the inner face of a portion of the lock.

Fig. 22 is an elevation of a part of the lock mechanism with certain parts shown separated.

Fig. 23 is a similar view of the same parts associated.

Figure 4:
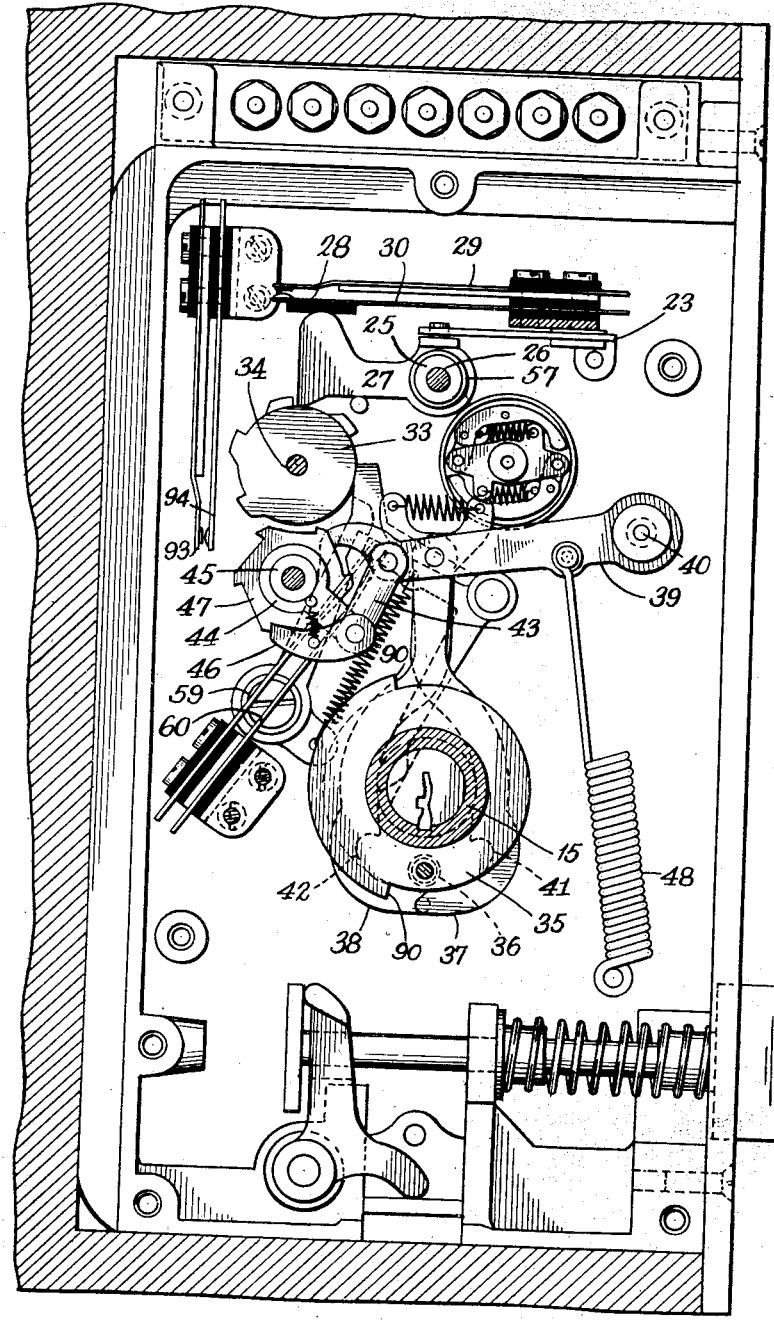
Fig. 4 is a central vertical section of the lock (looking from the left of Fig. 2) on a plane parallel to that of Fig. 3.
Figure 27:
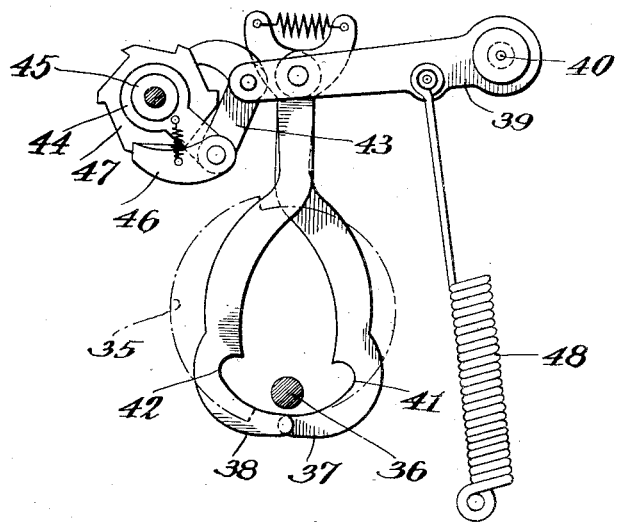

Figs. 24 and 25 are illustrations of printed cards as they come from the recorder, Fig. 26 is a circuit diagram showing the relations of locks to the recorder mechanism, and Fig. 27 is a detailed view in elevation of a portion of the mechanism shown by dotted lines in Fig. 4.

For convenience of reference, the succeeding paragraphs of this specification are numbered, using Roman numerals to avoid confusion with the appended claims. For the sake of brevity and clearness the description is confined as far as possible to the parts specifically illustrated, without reference to the many permissible variations and modifications thereof.

I. As before stated, the present embodiment of the invention takes into account (a) the number (or other characters) assigned to the several keys, so that any particular key used may be identified; and (b) whether the lock was operated from the inside or the outside of the room, referred to hereinafter as the "in" or "out" records; in addition to the (c) time of operation, which is rather the function of the recorder since the lock has nothing to do with "setting up" the time-printing devices of the recorder, but merely causes them to operate to make a record-imprint whenever the bolt is actuated. The present embodiment also provides for (d) identifying the lock, so that when two or more locks are used in the same system the record will show not only the time, the key, and whether the latter was inserted in the lock from the inside or outside, but also the lock that the key operated. Further, the present embodiment (e) prevents simultaneous operation of two or more locks of the same system. Hereinafter this is referred to as the "non-interference" feature, from the fact that it prevents one lock from interfering with the proper operation of another. Finally, after the above functions have been performed or the proper mechanism in the lock or in the distant recorder have been set or otherwise prepared for performing such functions, the lock (f) sends a current-impulse which sets the recorder into operation to print the desired records. The several circuits by which, in the present embodiment, the five functions a, b, d, e and f are performed or controlled, are referred to hereinafter as the key-circuit, the in-or-out circuit, the lock-circuit, the non-interference circuit, and the printing-circuit.

II. *Mechanism for controlling the key-circuit.*—The lock shown is of the "Yale" type and is mortised in the edge of the door. The inner parts are inclosed by a casing 10, except the outer tumbler-chambers 11, 12, which are fixed to the casing on the outside thereof. The latter are provided with the usual rotary barrels or plugs 13, 14, to receive, and be rotated by, the keys. Inside the casing 10 and in axial alinement with the key-plugs 13, 14, is an intermediate rotary barrel or sleeve 15, containing, see Figs. 6, 22 and 23, an auxiliary key-plug 16 to receive the extended end or tip of the key when the latter is inserted from inside of the room, and a similar auxiliary key-plug 17 to receive the end of the key when the latter is inserted from the outside. The key-plugs named are securely fastened to the sleeve 15 and carry radially movable pins 18, 19, so that the key being inserted into either plug will rotate the sleeve if the key be turned. It will be understood of course, that the inner plugs 16, 17, are not rotated by the plugs 13, 14, but by the key, projecting into one inner plug or the other. Thus in Fig. 6 the key rotates the inner plug 17, carrying sleeve 15, on which is plug 16.

III. When there is no key in either of the outer plugs 13, 14 (described in Par. II), both of the radially movable pins 18, 19 are in their lowermost positions, like the pin 18, at the right in Fig. 6. When a key is inserted into one of the outer plugs the adjacent pin is raised to an extent determined by the width of the coöperating end of the key, as shown, for example, at the left of Fig. 6. Or, if the key is narrow enough the pin is not raised, but remains in its lowermost or initial position. It is the radial movement of these pins, from no movement to the maximum, that primarily determines the number of current impulses sent over the key-circuit to identify the particular key used. In the present embodiment of the invention provision is made (as fully described in Par. IV), for the identification of six keys. That is to say, six different numbers of impulses, from zero to five.

IV. Across the lock at the front is a rock-shaft 20, Figs. 3 and 19, having rigidly fixed to it at one end a bell crank lever 21, the horizontal arm of which over-hangs and bears upon the pin 19. At the other end the shaft has rigidly fixed to it a horizontal arm 22, extending over and bearing upon the pin 18. Hence if either pin is shifted by a key the bell-crank will be rocked in the clockwise direction, as seen in Fig. 3. The end of the upwardly extending arm of the bell-crank 21 is connected with one arm of a horizontal bell-crank 23, Figs. 3 and 7, fulcrumed on a bracket 24. The other arm of the last-mentioned bell-crank is connected to a sleeve 25, which can slide and also rock on the shaft 26. Evidently, the extent of shift of the sleeve by the bell-crank 23 depends upon the extent of radial movement of the pins 18, 19, (Par. III) by the key. Fixed to one end of the sleeve is an arm or contact-actuator 27 (see also Fig. 4) which underlies an insulating plate 28 fixed on the lower of the two key-contacts 29, 30, carried on bracket 24. This plate extends over the whole range of axial movement of the arm 27, so that the contacts will be closed by swinging the arm upwardly at any of its positions on the shaft 26. The vibration or upward and downward swinging movement of the arm 27 is effected by the means described in Par. V.

V. To swing the arm or contact-actuator 27 described in Par. IV a series of cam-disks 31, 32, 33, (Figs. 4, 8 and 13) is provided, fixed on a shaft 34 and rotated by mechanism explained in Par. VI. Cam 32 has one tooth or projection on its periphery. Hence if the contact-actuator stands over cam 32 it will be raised once in a complete rotation of the cam and will therefore close (and open) the contacts 29, 30, once, thereby sending one impulse over the key-circuit. Cam 31 has four projections, and hence if the contact-actuator lies over the cam mentioned four impulses will be sent over the circuit. Similarly, cam 33 has two projections and hence causes two impulses to be transmitted. If the contact-actuator is shifted from its initial position (by the means described in Par. IV) far enough to overlie both cams 32 and 31, it will be engaged and rocked by five projections one on cam 32 and four on cam 31, thereby sending five impulses; it being understood, of course, that the projections on the three cams are none of them in axial alinement but are all spaced apart angularly as well as axially. Also, if the contact actuator overlies both cams 32 and 33, and one tooth or projection on the first-named and the two on the second-named will together rock the actuator three times, thus sending three impulses. At its initial position the actuator does not overlie any of the cams and is not rocked at all, the contacts 29—30 remaining open when the cam-series is rotated. Thus with three cams and five positions of the actuator six numbers are provided for, namely, 1, 2, 3, 4, 5 and 6, serving to identify six different keys. By increasing the number of cams and the number of positions of the contact-actuator a larger number of keys can be identified.

VI. The shaft 34 (Fig. 13) carrying the three cams 31, 32, 33, by which the contacts 29, 30 are closed as described in Par. V, is rotated by the following mechanism, best shown in Figs. 3, 4 and 6. Fixed on and rotating with the sleeve 15 (Fig. 4), which is rotated by the key as explained in Par. II, is a disk 35, Fig. 6, having at its lower edge an axially extending stud 36. Straddling the sleeve 15 is a pair of links 37, 38, see Fig. 27, pivoted at their upper ends to a swinging arm 39 (pivoted at 40) and near their lower ends provided with recesses 41, 42, in position to be engaged by the stud 36 as the disk 35 is rotated in one direction or the other. The link engaged is thus raised until its undersurface hanging end strikes the curved undersurface of the sleeve 15 and is thereby cammed outwardly, thus disengaging the recess from the stud. On the free end of the arm 39 (which is raised by one or the other of the links 37, 38, as just explained), is a link 43, pivotally connected to an arm 44 loose on a shaft 45. This arm carries a pawl 46, coöperating with a ratchet 47 fixed on the shaft just mentioned. When the pawl is raised by the arm 39 it is retracted over one of the six teeth on the ratchet 47; and when the arm is drawn down by the spring 48 the pawl is advanced, thereby giving the ratchet and the shaft 45 one-sixth of a revolution. Fixed on the shaft is a gear 49 (Fig. 3) meshing with a pinion 50 fixed on shaft 34, on which, as explained in Par. V, the contact-actuating cams 31, 32, 33 are fixed. Gear 49 has sixty teeth and pinion 50 has ten. Hence the one-sixth revolution of the gear, produced by the described upward swing of arm 39, gives pinion 50, shaft 34, and the cams 31, 32, 33, a complete revolution, thereby causing the contact-actuator 27 (Par. LV) to be rocked by every tooth on such cam or cams it may overlie.

VII. From Fig. 3 it will be observed that when the sleeve 15 (Par. II) is rotated by the key the pin 19 (or pin 18, Fig. 6, as the case may be) is quickly carried out from under the horizontal arm of bell-crank 21,—or pin 18 is carried out from under arm 22 if pin 18 be the one that has been raised by the key. Spring 51, connected to an arm 52 on shaft 20, would then immediately swing the bell-crank back (counter-clockwise) thereby restoring the upper bell-crank 23 and contact-actuator 27 (Par. IV) to initial position before the actuator had been rocked to send the desired current impulses over the key-circuit. To avoid this result, and to hold the actuator over the proper cam or cams 31, 32, 33, the following devices are provided. Fixed to the sleeve 15, alongside of the disk 35 (Par. VI), is a disk 53, Figs. 3, 6 and 10, having in its periphery a recess 54 to receive the lower end of a vertical lever or pivotal selector 55, when said disk 53 is in its initial position. The upper end of the selector has a knife edge 56 to coöperate with any one of five grooves 57, (Fig. 11) on the sleeve 25, which, as explained in Par. IV, is mounted to slide on shaft 26 and carries the contact-actuator 27. These grooves are spaced apart in correspondence with the five positions to which the sleeve is shifted by the insertion of the key in the lock, as described in Par. IV. Now when the sleeve 15 is rotated by the key the initial movement of the sleeve cams the lower end of the selector 55 out of the notch 54, thereby swinging the selector counterclockwise (as shown in Fig. 10) and bringing the knife-edge at its upper end into the particular one of the grooves 57 that was brought to the plane of the knife-edge by the axial shifting of the sleeve 25. Thereafter the sleeve is locked by the selector or locking member 55 until the disk 53 returns to its initial position, whereupon the spring 58 restores the selector to normal position, the lower end swinging again into the notch 54. In the meantime all the other functions of the lock have been performed.

VIII. *Mechanism for controlling the in-or-out circuit.*—The in-or-out contacts 59, 60, Figs. 4, 13, 14, are closed by a stud 61, mounted on an angular or bent arm 62 pivoted at 63. This arm has a finger 64 bearing on the one-tooth of cam 32. As explained in Par. VI, the cam 32 is rotated once in each complete actuation of the lock. Hence in each rotation of the cam the arm will be rocked and the contacts closed once by the cam mentioned, thereby sending one impulse over the in-or-out circuit. Pivoted on the end of the arm is a depending arm 65 bearing on a flat surface 66 formed on one side of the inside key-plug 13, which, it will be remembered, is rotated only when it receives the key and the lock is operated from inside the room. The arm has a finger 67 extending toward a notch 68 in the upper end of an arm 69 pivoted alongside of but adapted to swing independently of the arm 62. A spring 70, connected to arm 67 and to a finger 71 on arm 69, holds the pivoted parts normally in the positions shown in Fig. 13. The arm 69 is in the plane of the two-toothed cam 33. Hence when the parts are in the positions shown the rotation of cam 33 will rock the arm 69 before cam 32 rocks arm 62, which lies in its plane, but arm 69 will rock idly because finger 67 is in the path of the notch 68. If, however, the inside key-plug 13 is rotated (by inserting the key from inside the room and turning the key in either direction) the arm 65 will be swung clockwise (in Fig. 13) thereby positioning the end of the finger 67 above the notch 58. Then when the cam 33 rotates, and rocks arm 69, the latter will find arm 67 in its path and accordingly arm 62, on which arm 65 is mounted, will be rocked also, thereby closing contacts 59, 60, and sending an impulse over the in-or-out circuit. The single projection on cam 32 then reaches the finger 64 and rocks arm 62 again, thereby closing the contacts 59, 60 a second time and sending a second impulse over the circuit. It will thus be seen that when the cams are rotated without rotation of the inside key-plug 13, that is, when the cams are rotated by inserting and turning the key from the outside, one impulse will be sent over the in-or-out circuit; but that when the inside key-plug 33 is rotated, as can happen only when the key is inserted into the lock from inside the room, two impulses will be sent over the circuit. It might be supposed that when the second tooth or projection on the cam 33 reaches the arm 69 it would rock the latter again and thereby send a third impulse over the circuit. In the construction shown, however, the one tooth on cam 32 and the second tooth (the uppermost in Fig. 13) are so close together that when the latter reaches arm 69 the arm 62 (which alone can close the contacts 59, 60) is still held in its rightward position by the single tooth on cam 32 and does not swing back to initial position, thereby permitting the contacts to open again, until the second tooth on cam 33 has passed the arm 69. Hence the second actuation of arm 69 tends to keep the circuit closed until arm 69 is released by the second tooth on cam 32, at which time the circuit is broken. It will be understood, however, that the parts could be constructed to send three impulses if such number were desired.

IX. *Mechanism for controlling the lock-circuit.*—The contact mechanism that controls the operation of the recorder to print a number or other character to identify the lock (or the door in which the lock is used) is shown best in Figs. 10 and 11. The contacts 72, 73, which control the lock circuit, extend downwardly in the plane of the horizontally arranged key contacts 29, 30 and are actuated by a stud 74 on the end of the depending arm 75 swinging on a transverse pivot 76. The arm has a lug 77 coöperating with and always traveling on a cam 33ᴬ on shaft 34 which, as has been shown, is rotated at each complete operation of the lock.

The cam 33ᴬ has any desired number of projections, none if desired, and as the projection 77 rides over the periphery it sends to the recorder by the operation of the contacts 72, 73, a corresponding number of impulses which will print the number of the lock operated. It will thus be seen that in the present embodiment five or six different door identifications are provided, as well as six different key identifications. There is this difference, however, in the operation of the two means, that while in the case of the key identifications the contact-actuator or arm 27 is shifted or adjusted by the particular key used, as explained in Par. IV, in the case of the door or lock-identifications there is no lateral shifting or adjustment of the arm 75, since each door or lock has its own permanent identifying number or other character. Hence the arm 75 is located in a permanent position with its lug 77 engaging cam 33ᴬ.

X. *Mechanism for controlling the non-interference circuit.*—As stated in Par. I, provision is made whereby the locks in the system can only be operated singly and not two or more simultaneously, the purpose being to prevent the making of confused or unintelligible or misleading records. This function is under the control of contact-mechanism which is best shown in Figs. 7, 17 and 18. The contacts 78, 79, in the non-interference circuit, are mounted alongside of the key-circuit contacts 29, 30, and are actuated by a stud 80 on an arm 81 which is mounted to swing on shaft 26 as a pivot. The arm also has a finger or lug 82, which initially rests in a notch or recess in the periphery of a wheel 83 fixed on shaft 34. As described in Par. VI, this shaft is rotated when the lock is operated; and it will be seen that when the rotation begins the arm 81 is cammed upwardly, thereby closing the contacts 78, 79. It will also be seen that the contacts remain closed until the wheel or cam 83 returns to its initial position and the arm 81 can drop back into its recess. Each lock of the system is provided with a magnet 84, in circuit not with its own non-interference contacts, but only with the corresponding contacts of the other locks in such manner that the closing of the non-interference contacts of any lock in the system energizes the magnets 84 of all the other locks in the system. The magnet 84 is suspended from a bracket 85, Figs. 9 and 17, fastened to the side of the lock-casing. At the bottom of the bracket is a stud 86 constituting a pivot for a bellcrank lever 87. The horizontal arm of this lever is of inverted U-shape (see Fig. 5) and carries the armature 88. The vertical arm of the bellcrank lever has its upper end shaped to operate as a detent for the disk 89 (Fig. 17) having shoulders 90 on its periphery. This disk is fixed on the sleeve or barrel 15 (Par. II) and hence rotates in one direction or the other whenever the lock is operated. It will therefore be seen that when the magnet 84 is energized the bellcrank 87 will be rocked counterclockwise (Fig. 17), thereby throwing the upper arm of the bell-crank against disk 89 and in the path of the shoulders 90. Consequently the sleeve 15 can turn (in either direction) only until one of the shoulders strikes the detent and can turn no farther until the magnet is deënergized. A spring 91, Fig. 3, connected to an arm 92 which is rigidly attached to the bell-crank, is provided to restore the latter to normal position. In the drawings the magnet is supposed to be energized and the bell-crank is accordingly shown in its corresponding position.

XI. *Mechanism for controlling the printing operation of the recorder.*—As stated in Par. I, after the printing elements of the recorder have been set up or adjusted to print the key, door, and in-or-out identifications the recorder is put in operation, by current transmitted by the lock, to print the record. The mechanism by which the lock exercises this control is illustrated in Figs. 4, 7, 8 and 12. The printing circuit, over which the current is transmitted, is controlled by contacts 93, and 94, alongside of the door-number contacts 72, 73 (Par. IX), which contacts 93 and 94 are closed by a stud 95 on the depending arm 96 mounted at its upper end to swing arm 96 on the shaft 76. This arm has a lug 97 coöperating with the cam 32 fixed on the shaft 34, which, as explained in Par. VI, is rotated at each operation of the lock; with the result that when the tooth or projection on the cam passes the lug 97 the arm is rocked and the contacts are closed once, thereby transmitting one impulse over the printing circuit.

XII. *Mechanism for preventing incomplete operation of the lock.*—The cross-shaped member 99, Fig. 3, pivoted on a stud 100, carries on its arms two pawls 101, 102, to coöperate with a straight-toothed ratchet 103 fixed on the sleeve 15, which latter, as explained in Par. II, is rotated by the key when the lock is operated. On the disk 89, Fig. 9, which is also fixed to the sleeve or barrel 15, is a stud 104 coöperating with the nose 105 of the pawl-carrier 99. The latter has a tail 106 engaged by the pointed end of a pivoted spring-actuated arm 107. With the parts in the positions shown in Fig. 3 it will be seen that the sleeve 15 and ratchet 103 cannot be rotated clockwise because the latter is held by the pawl 102. They can, however, be rotated counterclockwise (to retract the bolt 108) but during the counterclockwise rotation the pawl 102 will always prevent backward movement until the movement in the counterclockwise direction is completed. As the ratchet, turning in the last-named direction, approaches its initial position and stud 104 engages the nose 105 and swings the pawl carrier 99 clockwise on stud 100, against the yielding pressure of arm 107, and it thereby disengages pawl 102 from the ratchet and throws pawl 101 into engagement therewith. Then the sleeve 15 can be rotated clockwise (to advance the now retracted bolt) but at no point in the clockwise movement will the pawl 101 permit backward movement. Hence if the operator once turns the key far enough to carry tooth 109 past pawl 102 (or 101, as the case may be) he cannot return the parts to initial position by backward rotation of the key. In order to prevent withdrawing the key and leaving the lock partially operated the key-plugs and barrels are constructed (as is a common practice in locks of this type) in such way that the key can only be withdrawn when it stands in its initial position. Consequently the operator must either leave his key in the lock or go on and complete the operation that he has begun.

XIII. *Bolt-actuating mechanism.*—The bolt 108, Figs. 3 and 10, is slidably mounted on pins 110 extending through the slots 111. In the lower edge of the bolt, adjacent to the sleeve 15, is a recess 112 (shown in dotted lines in Fig. 10) which is normally covered by the forward end of an arm 113 pivoted at its rear end on the rear end of the bolt. A spring 114 normally holds the arm in depressed position, as shown, against the stop 115 on the bolt. The arm has on its upper edge a lateral lip or lug 116, and on one side of the lock-casing is a stud or stop 117 extending into the path of said lug. The bolt being shown in its advanced position in Figs. 3 and 10, it will be seen that the bolt cannot be retracted because the aforesaid stop 117 is in the path of the lug 116. When, however, the sleeve 15 is rotated by the key in the counterclockwise direction the stud 36 engages the arm 113 and lifts the same, thus carrying the lip above the stop 117. Then the stud, continuing its counterclockwise movement in engagement with the recess 112, retracts the bolt. As the latter reaches its retracted position the stud 36 passes out of the recess, thus allowing the arm to drop to initial position with the lug 116 behind stop 117. The bolt then cannot be advanced unless the arm is first raised by clockwise movement of the stud 36.

Hereafter in the claims I will term the devices mounted upon shaft 34 controller devices. These include cams 31, 32, 33, 33ᴬ and wheel 83.

In order to illustrate graphically the recording operation of the system Fig. 26 is added to the drawings. In this figure four locks, A, B, C and D are represented, a recorder E and its circuit connection between the latter and the locks. For convenience the various mechanisms in the lock are distinguished by letters of reference. F designates two contacts that record the key number or letter, G the contacts that prevent interference of one lock with the operation of another, H the contacts which indicate whether the key is inserted from the inside or the outside, I those that indicate the particular door to which the operated lock is applied, and K those which control the printing.

Each lock, as well as the recorder, is provided with a suitable number of terminals which are lettered $f$, $g$, $h$, $i$, and $k$ to correspond with the contacts similarly designated by capital letters, in addition to a terminal $l$ for a common return wire, and a terminal $m$ to the interference magnet 84 of each lock, the circuit of which is controlled by a suitable device in the recorder. It will not be necessary in view of these designations to trace each circuit as their relations and operations will be obvious. It need only be stated that the circuit 119 is from a program or timing device which during predetermined hours will switch in a burglar alarm circuit containing a bell, but at all other times the circuit from the in and out contacts to the recorder is made direct.

The recorder contains proper devices which in this application need not be described in detail for responding to the impulses sent from the lock. These include the means for setting up the indications giving the lock operated and marked 120; that for the key marked 121; that for the in and out signals marked 122, the printing, the non-interference magnets, the time type wheels and other elements, all of which will be described in detail in another application.

This system is complete in its provisions for indicating all the facts of importance in connection with the operation of locks controlling the entrance to and exit from commercial houses, banks, and similar establishments. The recorder prints on a strip of paper such as is shown in Fig. 25 the time of operation of a lock, and any other data desired, in connection with which the person operating the lock signs his name on the strip. Or, as shown in Fig. 24, the record may be printed in a narrower strip giving any or all of the data which the operation lock effects in the setting up and printing mechanism of the recorder.

There are numerous minor features in this device that have not been gone into in any detail, but which will be recognized by one skilled in the art as important and useful. Among these is some device that will act as a brake to prevent the key from being turned too rapidly in the lock. This device is shown in Fig. 3 as composed of a spring retracted brake lever 123, which when rotated by a pinion in mesh with the gears in the lock will be thrown out by centrifugal force against the wall of a barrel 124, and by its frictional contact act as a brake.

Another detail is the means for holding the casing of the lock together while permitting it to be separated by authorized persons. For this purpose I use a bolt 125 shown in Fig. 2, which has a grooved head on the inside of the door and which screws into a headed socket 126, set in the plate of the casing on the outside of the door. By this means the bolt may be withdrawn by a suitable tool, but only from the inside.

The above and other features, which will be understood without explanation by those skilled in the art, all contribute to the practicability and success of the lock.

What I claim as my invention is:

1. In a recording lock the combination of the following elements, a rotary barrel composed of independent sections one outside section and its adjacent inner section being engaged by and turned with a key inserted into the lock, contacts controlling a circuit to a recording mechanism and operated to send one impulse whenever the lock is turned from either side, and means controlled by the sections on one side of the lock to operate said contacts to send two impulses of current and thus indicate whether the key has been inserted from the inside or the outside of the lock.

2. In a recording lock, the combination of the following elements, a rotary barrel for receiving the key, a pin therein movable through a space corresponding to the conformation of a part of said key, a contact actuator adapted to be moved laterally and set through the instrumentality of said pin, to a position corresponding to the extent of the movement of said pin, rotary contacts in parallel series of different numbers over which said actuator is set, a circuit to a recorder controlled by said contacts, whereby said recorder will be operated to record one or more impulses according to the position to which the actuator has been set, and to thus indicate by the number of such impulses the key used in the lock.

3. In a recording lock the combination of the following elements, a rotary barrel composed of independent sections, two movable parts thereon one adapted to be reached and turned by a key inserted from the inside and the other by a key inserted from the outside, and each adapted to be moved through a space corresponding to the conformation of the engaging part of the key, a contact actuator adapted to be set through the instrumentality of said movable part to a position corresponding to the extent of movement of the same and contacts controlling a circuit to a recorder operated to send one or more impulses according to the position to which the actuator has been set and adapted to indicate by the number of closures the key used in setting the actuator.

4. In a recording lock the combination of the following elements, a rotary barrel for receiving a key, a single pair of contacts controlling a circuit to the recorder, a rotary cam for operating said contacts and having a predetermined number of projections corresponding to the particular lock in which it is used, said cam operating the pair of contacts a number of times dependent upon the number of projections, connections between said cam and the barrel whereby the operation of the latter imparts rotation to the cam, whereby when the lock is operated the number of impulses indicating it will be sent to the recorder.

5. In a recording lock system, the combination of the following elements, means in a recorder for indicating the particular key used for operating any lock controlled by the particular form or character of key used for operating said lock, and locking mechanism in each lock for preventing it from being operated, circuit controllers in each lock operated by the full rotary movement of the key in any one lock, a circuit extending to all the locks adapted to be closed by the operation of any one of said circuit controllers, and electro-magnets which are energized by such closure to prevent the operation of all locks in the system except that with which a proper key is being used.

6. In a recording lock the combination of the following elements, a rotary barrel adapted to receive a key, contacts for controlling circuits to a recorder for setting up in said recorder mechanism to indicate the key used, the lock operated and other data, contacts for controlling non-interference magnets in other locks in the same system, contacts for controlling a circuit to the recorder for operating printing mechanism therein, and means operated by the rotation of the barrel and the shape of the particular key used for operating said contacts and thereby operating the recorder.

7. In a recording lock the combination of the following elements, circuit controllers operated by the insertion and turning of a key to send impulses from the lock to a recording mechanism, and a circuit controller operated by the rotary movement of a part of the lock mechanism to close a circuit to locking magnets in all the other locks of the system whereby that lock only which is operating said circuit controller can be operated.

8. In a recording lock the combination with a notched disk which is turned through one revolution by every operation of the lock, an arm bearing upon the periphery of said disk and adapted to close contacts controlling a non-interference circuit at all times except when normally resting in the notch, whereby any movement of the lock will prevent any other locks in the system from being operated until its own operation has been completed.

9. In a recording lock in combination, a rotary barrel adapted to be rotated by a key, a shaft adapted to be rotated through a complete revolution each time the key and the rotary barrel are rotated, means for rotating said shaft from said barrel, a series of cams having variable numbers of contact making projections adapted to be rotated by said shaft, a part movable through a space corresponding to the conformation of a part of said key, a contact actuator adapted to be variably shifted in position relative to said cams by the movement of said part, and to be thereafter actuated by the cams upon the rotation of the shaft a number of times dependent upon its position with respect to the cams, a single pair of contact devices adapted to be actuated by the contact actuator, and a circuit to a recorder controlled by said contacts, whereby said recorder will be operated to record one or more impulses to thus indicate the key used in the lock.

10. In a recording lock in combination, a rotary barrel adapted to be rotated by a key, controller devices actuated thereby for each rotation of a key in the barrel, a single pair of key designating contacts, an actuator for said contacts itself actuated by said circuit controller devices and means for shifting said actuator to variable positions relative to the controller devices to thereby vary the number of actuations to be imparted to it by said devices, said shifting means being controlled by the conformation of the particular key used whereby a circuit to a recorder is pulsed a predetermined number of times for each different key used and whereby a key designating member is set up in the recorder.

11. In a recording lock, in combination, a rotary barrel adapted to be rotated by a key, controller devices actuated thereby for each rotation of a key in the barrel, a single pair of key designating contacts, an actuator for said contacts itself actuated by said circuit controller devices, means for shifting said actuator to variable position relative to the controller devices to thereby vary the number of actuations to be imparted to it by said devices, said shifting means being controlled by the conformation of the particular key used whereby a circuit to a recorder is pulsed a predetermined number of times for each different key used and whereby a key designating member is set up in the recorder, and a pair of printing controller contacts also actuated by said controller devices for establishing a circuit to the recorder and effecting the printing just prior to the complete rotation of a key in the barrel.

12. In a recording lock, in combination, a rotary barrel adapted to be rotated by a key, controller devices actuated thereby for each rotation of a key in the barrel, a single pair of key designating contacts, an actuator for said contacts itself actuated by said circuit controller devices, means for shifting said actuator to variable position relative to the controller devices to thereby vary the number of actuations to be imparted to it by said devices, said shifting means being controlled by the conformation of the particular key used whereby a circuit to a recorder is pulsed a predetermined number of times for each different key used and whereby a key designating member is set up in the recorder, and a second pair of contacts adapted to control a circuit to a recorder in accordance with the inside or outside insertion of the key, said pair of contacts being actuated by said circuit controller devices by the movement thereof and having associated therewith a part movable in accordance with the inside or outside insertion of the key for controlling the number of times said pair of contacts are actuated by said controller device.

13. In a recording lock, in combination, a rotary barrel adapted to be rotated by a key, controller devices actuated thereby for each rotation of a key in the barrel, a single pair of key designating contacts, an actuator for said contacts itself actuated by said circuit controller devices, means for shifting said actuator to variable position relative to the controller devices to thereby vary the number of actuations to be imparted to it by said devices, said shifting means being controlled by the conformation of the particular key used whereby a circuit to a recorder is pulsed a predetermined number of times for each different key used and whereby a key designating member is set up in the recorder, and a pair of contacts for controlling a lock number circuit to the recorder, said contacts being actuated by the circuit controller a number of times dependent upon the lock number of the lock actuated, said circuit controller having provisions for variably actuating said contacts in accordance with the lock number.

14. In a recording lock, in combination, a rotary barrel adapted to be rotated by a key, controller devices actuated thereby for each rotation of a key in the barrel, a single pair of key designating contacts, an actuator for said contacts itself actuated by said circuit controller devices, means for shifting said actuator to variable position relative to the controller devices to thereby vary the number of actuations to be imparted to it by said devices, said shifting means being controlled by the conformation of the particular key used whereby a circuit to a recorder is pulsed a predetermined number of times for each different key used and whereby a key designating member is set up in the recorder, and a pair of contacts for controlling an interference circuit to other locks, said contacts being actuated by said controller devices to thereby close the interference circuit and prevent concurrent operation of other locks when a key is being rotated in its barrel.

15. In a recording lock, in combination, a rotary barrel adapted to be rotated by a key, a single pair of key designating controlling contacts, an actuator for said contacts, means operated by the rotation of a key in the barrel for moving the actuator to actuate the contacts, means controlled by the variable conformation of the key for shifting the actuator to a predetermined position for each particular key used, said actuator in different predetermined positions being adapted to be actuated a variable number of times by the aforesaid means and to thereby open and close the single pair of contacts a corresponding predetermined number of times for each single complete rotation of a key, whereby a circuit leading to recorder is pulsed in accordance with the designation of the key used.

16. The invention set forth in claim 10 in which a ratchet and pawl mechanism and a gear train is interposed between the rotary barrel driven by the key and the controller devices to rotate the controller devices upon the rotation of a key.

In testimony whereof I hereunto affix my signature.

CLINTON E. LARRABEE.